United States Patent

[11] 3,574,425

[72] Inventors Henry A. Johnson
624 Daleview Ave., Dayton, Ohio 45405;
Gabe L. Campbell, Wayne Lakes Park,
Greenville, Ohio 45331
[21] Appl. No. 836,359
[22] Filed June 25, 1969
[45] Patented Apr. 13, 1971

[54] FABRICATION OF HOLLOW BALLS, FOR USE AS BALL BEARINGS, FROM POWDER
5 Claims, 4 Drawing Figs.
[52] U.S. Cl. ............... 308/200
[51] Int. Cl. ............... F16c 19/20
[50] Field of Search ............... 308/188, 190, 200, 195, 193

[56] References Cited
UNITED STATES PATENTS
3,491,423  1/1970  Haller ............... 29/182.3

Primary Examiner—Fred C. Mattern, Jr.
Assistant Examiner—Frank Susko
Attorneys—Harry A. Herbert, Jr. and Arthur R. Parker ABSTRACT: A hollow ball structure, for use in a ball bearing application, having two half shells constructed of powdered material made porous to absorb a lubricant therewithin to be automatically exuded onto the surface of the bearing and bearing races, and thereby provide a self-lubrication feature to the structure. The powdered ball bearing may be utilized in a bearing assembly in alternate relation with both solid and other types of hollow ball structures to thereby provide both strength, flexibility and lubrication.

PATENTED APR 13 1971

3,574,425

INVENTORS
HENRY A. JOHNSON
GABE L. CAMPBELL
BY Harry A. Herbert Jr
ATTORNEY
Arthur R. Parker
AGENT

FABRICATION OF HOLLOW BALLS, FOR USE AS BALL BEARINGS, FROM POWDER

BACKGROUND OF THE INVENTION

This invention relates generally to hollow ball structures and, more specifically, to the self-lubrication of such structures, particularly when used in a ball bearing application.

In previously-developed hollow ball members used in ball bearing assemblies, the two hemispheres comprising the hollow ball construction have usually required either a continuous source of lubrication, or alternatively, have been preloaded with lubricant which may have been either inadequate, or excess to the needs of the particular bearing application. Other applications have involved the use of lubricant coatings applied as a film to the bearing surface, either during, or after the manufacture thereof. However, although some of the latter developments have involved film coatings of satisfactory wearability, further improvement has been indicated particularly in bearing applications at remote, hard-to-reach locations, or, for example, the use thereof in space applications. The latter applications have been solved, or at least, substantially improved by the solution offered by the present invention, which is set forth hereinafter in the following summary and detailed description thereof.

SUMMARY OF THE INVENTION

The present invention ensures that the hollow ball type of construction incorporates an improved and yet simplified and more efficient means of self-lubrication. To this end, the two hemispheres comprising the ball structure are formed from a powdered metal material that is made porous in nature for the express purpose of ensuring the provision of a continuous supply of an appropriated lubricant material which has been previously stored in the pores provided in the said hemispheres. Each of the two hemispheres having the aforementioned self-contained supply of lubricant material is compressed by any suitable compression machine into the desired hemispheric configuration and thereafter they are sintered to thereby strengthen the bonds between the inherent particles thereof and thus form a compact member. These hemispheres may then be joined together and formed to the precise size and configuration desired for the particular bearing application. Of course, the lubricant to be used to impregnate or saturate the pores formed in this bearing structure may be applied, as for example by means of immersing in a reservoir of such lubricant as an essential step just prior to the sintering thereof during the fabrication of the two hemispheres into a unitary bearing structure. Additional immersion thereof in the required lubricant may also occur after the sintering operation to replace any lubricant lost during this step. Thus, because of the porous nature of the powdered material selected, the self-contained lubricant will filter out through the pores provided therein to thereby automatically coat the outside bearing surfaces of the ball bearing which, in turn, also automatically lubricates the bearing races. The lubricant may be introduced before or after fabrication of the hollow ball or roller. Pressure impregnation after fabrication may provide sufficient lubricant to allow substantial metered amounts of lubricant to be applied to the contact surfaces during operation of the bearing assembly. Thus, a more efficient and less wasteful lubricating operation is the inherent result of the present arrangement.

Other advantages, as well as objects, of the present invention will become evident hereinafter from the following disclosure thereof, in which:

DESCRIPTION OF THE PREFERRED EMBODIMENT

Figure 1:
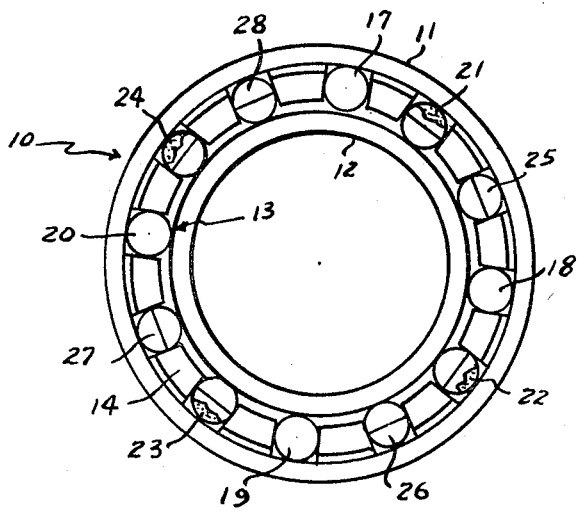
FIG. 1 represents an overall assembly view of the improved bearing arrangement of the present invention, as may be applied to either ball or roller bearing structures.
Figure 2:
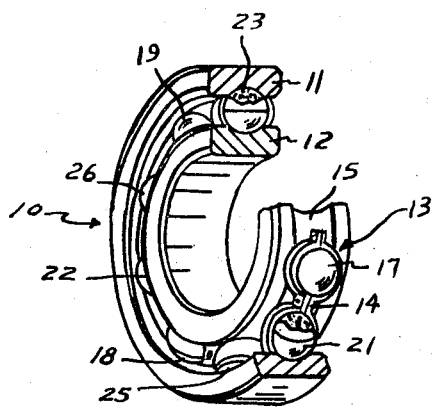
FIG. 2 is a second overall assembly view, partly broken away and cross sectioned, showing the improved bearing arrangement of the invention as it may be applied to a radial ball bearing.

Referring generally to the drawings and more specifically to FIGS. 1 and 2 thereof, the overall bearing assembly of the present invention is indicated generally at 10 as including an outer race 11, an inner race 12, and a plurality of rolling bearing elements indicated generally at 13. Although the aforesaid bearing elements 13 are indicated particularly in FIG. 2 as being of ball bearing configuration, they may also be fabricated as roller bearing elements for appropriate bearing applications. The bearing assembly 10 further includes a retainer, or cage element at 14 for retaining the ball bearing elements 13 in their correct rolling contact position in a pair of grooves formed respectively in said outer and inner races 11, 12 and one of which is illustrated at the reference numeral 15. In this regard, it is noted that, in the standard type of bearing assembly, the entire bearing elements incorporated therein, such as are indicated at 13, may be made of a suitable solid metal material, or alternatively, they may be made, for example, from a hollow ball configuration in which two half shells or hemispheres are welded together, or otherwise bonded into a unitary bearing structure.

Figure 3:
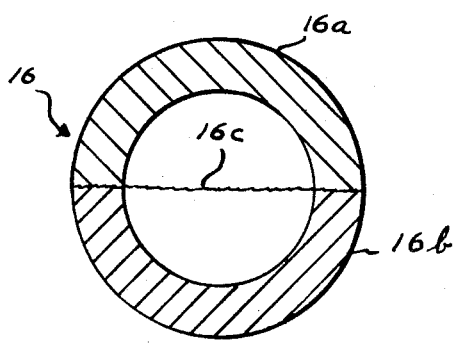
FIG. 3 is a relatively enlarged cross-sectional view of one of the bearing elements of the assembly applicable to either FIG. 1 or 2, to which the improvement of the present invention may be applied.
Figure 4:
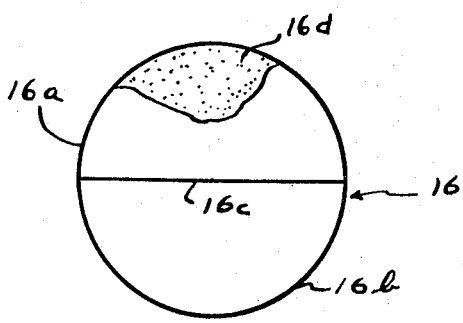
FIG. 4 is a second, relatively enlarged view, partly broken away and schematic in form, and depicting the powdered form of hollow ball construction involved with the present invention.

On the other hand, the unique development of the present invention consists principally in fabricating a hollow ball bearing element, such as that indicated generally at 13 in FIGS. 1 and 2, from a porous metallic powdered material. This novel arrangement is more particularly illustrated in the relatively enlarged views of FIGS. 3 and 4, where the hollow ball bearing element made in accordance with the present invention is shown generally at 16 as consisting of the two half shells or hemispheres at 16a and 16b. These hemispheres 16a, 16b may be welded or otherwise bonded together along the bonding line indicated at 16c in any appropriate manner. Of course, the latter type of hollow ball bearing, in itself, exhibits improved operation in that it is relatively light weight and yet has sufficient strength to perform appropriate bearing functions in such equipment, for example, as high-speed rotation machinery involved in airborne applications. The use of the porous powdered material, as taught by the present invention and as depicted at 16d in the aforementioned FIG. 4, further improves the construction of each hemispheric element of the hollow ball bearing element. Thus, each of the aforementioned half shells or hemispheres 16a, 16b may be made from the aforesaid porous powdered material, with the pores thereof impregnated, or saturated with an appropriate oil, or other suitable lubricant material. In particular, the steps involved in the present invention may include selecting a suitable porous powdered material, compressing this material into the approximate half shell or hemispheric configuration desired, further preparing the hemispheres thus obtained by sintering each to thereby form a compact bearing structural element, and then welding, or otherwise joining together the two half shells, such as that previously-noted at 16 in FIGS. 3 and 4. After the bearing ball is thus formed, it can be swaged down to the proper size to permit, or thereby facilitate the lubricant being stored in the pores of the powdered metal to be exuded therefrom and, in this novel manner, provide continuous lubrication of the bearing rolling elements, as at 13 in the assembly of FIGS. 1 and 2, and the appropriate surfaces of the inner and outer races 12, 11. A unique feature of this arrangement is that this improved "built-in" lubrication continues as it is needed under operating conditions and, moreover, automatically increases at heat is accumulated on the bearing assembly surfaces.

Although the development of a self-lubricating rolling bearing element from a porous powdered metal, in itself, constitutes a unique and novel feature of the present invention, a further application of such a self-lubricating bearing element involves the use of such a porous powdered element arrangement in alternately spaced relation in a bearing assembly with a series of both solid ball bearing elements, and plain hollow-type of ball bearing elements. With specific reference to the previously-described FIGS. 1 and 2, the operation of the aforementioned bearing assembly 10 may be improved, in accordance with the further teaching of the present invention, by mounting between the outer and inner races 11, 12, a first series of solid ball bearing elements, which are positioned at every third bearing location and which are specifically depicted at the reference numerals 17, 18, 19 and 20. Alternately disposed therewith as a second series of bearing elements may be positioned the improved porous powdered metal hollow ball bearing elements of the present invention, as is illustrated at 21, 22, 23 and 24, respectively. These latter elements would, of course, be similar or identical to that previously described at 16 with particular reference to FIG. 4. Finally, a third series of plain hollow ball bearing elements of simple construction consisting of two metallic hemispheres joined together, in a manner similar to that previously indicated at 16a, 16b in FIG. 3, would be further alternately positioned in successive order immediately after a corresponding porous powdered hollow ball bearing element, as is indicated respectively at 25, 26, 27 and 28.

With the foregoing novel arrangement utilizing the inventive self-lubricating bearing element construction in concert with both solid and plain hollow bearing elements, the standard types of bearing assemblies, such as is otherwise indicated in the aforesaid FIGS. 1 and 2, are significantly improved in that they would exhibit greater flexibility in particular bearing applications and would, furthermore, incorporate a more even overall degree of strength and self-contained and longer lasting lubrication in applications where outside lubrication is difficult, if not impossible.

The same features described above for the rolling bearing elements may also be applied to components of the bearing assembly, other than the ball or roller bearing elements. Therefore, this invention, for example, should and would be applied to various combinations of the inner and outer race members of the overall bearing assembly.

We claim:

1. In a rolling bearing assembly; an inner race member; an outer race member; and a plurality of rolling bearing elements positioned in rolling contact between said race members and comprising a separate set of solid, plain hollow and self-lubricating bearings respectively arranged in alternate relation in said assembly to thereby provide the required strength, flexibility and lubrication.

2. In a rolling bearing assembly as in claim 1, wherein each of said set of self-lubricating bearings consists of a pair of half shell members joined together into a unitary bearing structure and each incorporating therewithin a plurality of lubricant-saturated pores automatically applying a relatively metered amount of lubricant to the bearing surfaces substantially in accordance with the expenditure thereof during the operation of the bearing assembly.

3. In a rolling bearing assembly as in claim 1, each of said self-lubricating bearings comprising a powdered metal element consisting of two half shell members impregnated with a self-contained lubricant material adapted to be automatically applied to the bearing and race member surfaces of the bearing assembly in which utilized.

4. In a rolling bearing assembly as in claim 1, wherein each of said self-lubricating bearings comprises a pair of half shell members joined together and consisting of a porous metal material impregnated with an automatically applied lubricant.

5. In a rolling bearing assembly as in claim 4, wherein each of said self-lubricating bearings further comprises a porous powdered metal.